US012646534B2

(12) United States Patent
Shin

(10) Patent No.: US 12,646,534 B2
(45) Date of Patent: Jun. 2, 2026

(54) CREATING VIDEO BOOKMARKS IN RESPONSE TO CONTENT-RELATED QUERIES

(71) Applicant: GOOGLE LLC, Mountain View, CA (US)

(72) Inventor: Dongeek Shin, San Jose, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/633,503

(22) Filed: Apr. 11, 2024

(65) Prior Publication Data

US 2025/0322850 A1      Oct. 16, 2025

(51) Int. Cl.
*G11B 27/34*          (2006.01)
(52) U.S. Cl.
CPC .................................... *G11B 27/34* (2013.01)

(58) Field of Classification Search
CPC .................................................... G11B 27/34
See application file for complete search history.

(56) References Cited

U.S. PATENT DOCUMENTS

| | | | |
|---|---|---|---|
| 2016/0328615 A1* | 11/2016 | Kumar ................... | G06V 20/47 |
| 2025/0077765 A1* | 3/2025 | Xu .......................... | G06F 40/56 |
| 2025/0209787 A1* | 6/2025 | Lin ........................ | G06T 7/0002 |

* cited by examiner

*Primary Examiner* — Girumsew Wendmagegn
(74) *Attorney, Agent, or Firm* — Lowenstein Sandler LLP

(57) ABSTRACT

A method for generating a video bookmark is provided. The method can include receiving a prompt comprising a description associated with a target scene within a video, generating a prompt embedding from the received prompt, identifying, based on a set of image embeddings each corresponding to a frame of the video, an image embedding corresponding to the prompt embedding, and generating a video bookmark at a frame associated with the identified image embedding.

22 Claims, 7 Drawing Sheets

200

500

Figure 6:
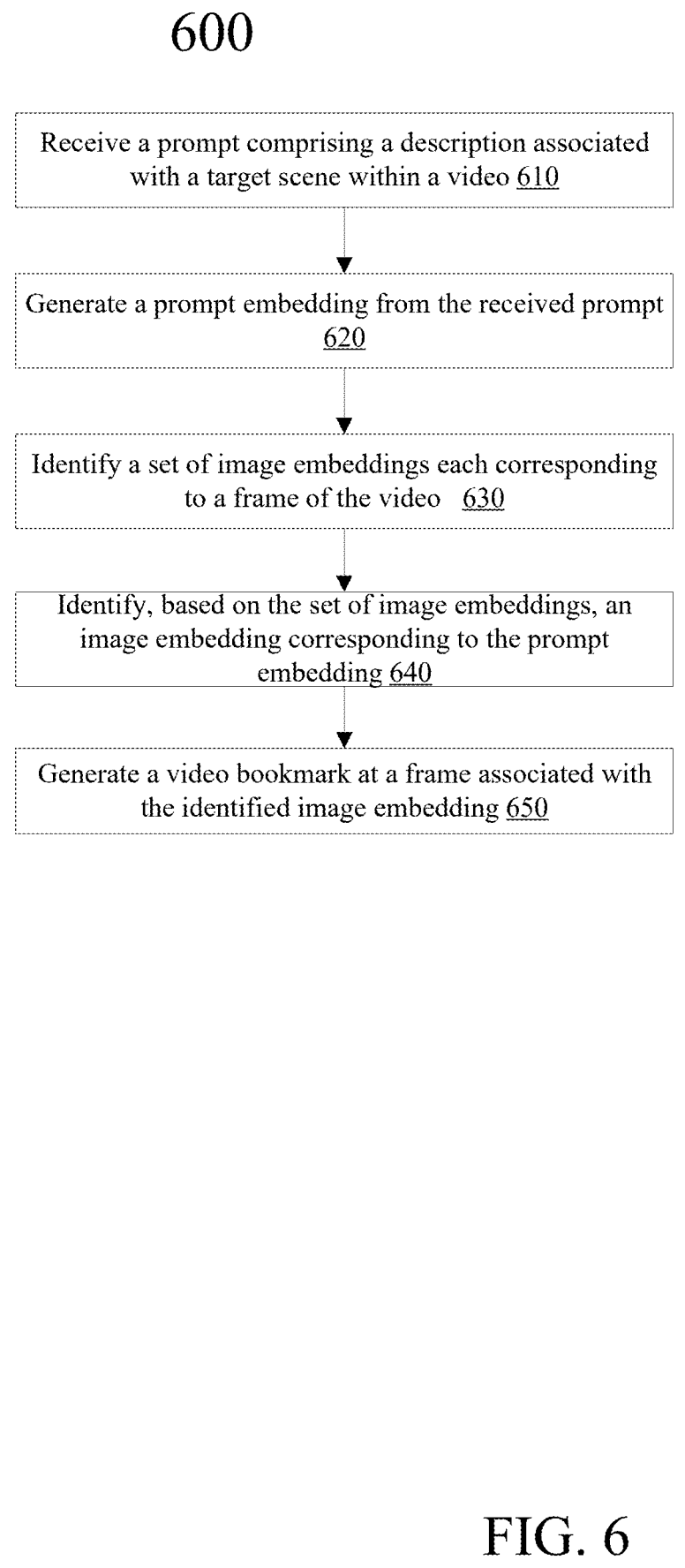

600

Receive a prompt comprising a description associated with a target scene within a video 610

Generate a prompt embedding from the received prompt 620

Identify a set of image embeddings each corresponding to a frame of the video   630

Identify, based on the set of image embeddings, an image embedding corresponding to the prompt embedding 640

Generate a video bookmark at a frame associated with the identified image embedding 650

PROCESSOR 702

PROCESSING LOGIC
726

MAIN MEMORY 704

INSTRUCTIONS 722

STATIC MEMORY 706

NETWORK INTERFACE
DEVICE 708

NETWORK
720

BUS
730

VIDEO DISPLAY 710

ALPHA-NUMERIC INPUT
DEVICE 712

INPUT CONTROL
DEVICE 714

SIGNAL GENERATION
DEVICE 716

DATA STORAGE DEVICE 718

COMPUTER-READABLE
STORAGE MEDIUM 728

INSTRUCTIONS 722

CREATING VIDEO BOOKMARKS IN RESPONSE TO CONTENT-RELATED QUERIES

TECHNICAL FIELD

The instant specification generally relates to systems and methods for generating video bookmarks in response to content related queries.

BACKGROUND

Video bookmarking is an integrated feature of modern video streaming platforms that allows a user to identify a video time localization (e.g., a video timestamp), similar to how one might place a physical bookmark in a physical book. A video bookmark denotes the beginning of a distinct segment within the larger video by marking a time localization (e.g., a frame, or small series of frames), as well as typically include a label with a description of the following section of video. A single video can provide numerous such bookmarks, including summaries of the content that follows, and offering viewers an at-a-glance understanding and expectation associated with each segment.

Video bookmarking can be indispensable for a viewer. For example, if a video is accurately bookmarked, a user can conveniently skip to portion they are interested in, forgoing material that can be irrelevant, remedial, or simply unengaging. In an example of bookmarking use, say that of a student watching an informational video, the student can traverse (skip) to the portion of the video containing the specific information they need to access, as well as return to rewatch. Such a feature can be helpful, particularly with long, or complex, videos; as well with videos that contain a variety of subjects and scenes. In such a way, such video chapters, bookmarks, and accurate labels can foster viewer retention, drive video engagement, enable accurate promotion of a video, and overall enhance a user experience when interacting with such a video within a video-streaming platform or database.

On the side of content creation, video bookmarks can provide valuable insights into user viewing habits. By analyzing which bookmarks are used most frequently, content creators can gain a better understanding of what parts of their videos are most engaging, or valuable, to their audience. This information can be used to guide for future content creation and refinement, enhancing their ability to deliver engaging, useful, or entertaining videos, that can resonate better with their target audience, promote the growth and otherwise enhance their ability to deliver an engaging experience to viewers.

SUMMARY

The below summary is a simplified summary of the disclosure in order to provide a basic understanding of some aspects of the disclosure. This summary is not an extensive overview of the disclosure. It is intended neither to identify key or critical elements of the disclosure, nor delineate any scope of the particular embodiments of the disclosure or any scope of the claims. Its sole purpose is to present some concepts of the disclosure in a simplified form as a prelude to the more detailed description that is presented later.

According to some aspects, a method for generating a video bookmark is provided. The method can include receiving a prompt comprising a description associated with a target scene within a video, generating a prompt embedding from the received prompt, identifying, based on a set of image embeddings each corresponding to a frame of the video, an image embedding corresponding to the prompt embedding, and generating a video bookmark at a frame associated with the identified image embedding.

In some embodiment, the description associated with the target scene comprises at least one of a description of the target scene, a description of content of the target scene, or a description of a sentiment contained within the target scene. In some embodiments, the method further includes generating the set of image embeddings each corresponding to a frame of the video. In some embodiments, wherein each corresponding frame is selected from a plurality of frames of the video according to at least one of, uniform subsampling or subsampling based on feature extraction from the video frames. In some embodiments, the uniform subsampling or the subsampling based on the feature extraction is defined based on computational constraints of a hardware device.

In some embodiments, identifying the image embedding corresponding to the prompt embedding includes identifying a reference image embedding of the set of image embeddings, wherein the reference image embedding most closely aligns with the prompt embedding, identifying neighboring frames of a video frame corresponding to the reference image embedding, generating a second set of image embeddings from the identified neighboring frames, and identifying, based on the second set of image embeddings, an image embedding corresponding to the prompt embedding.

In some embodiments, the set of image embeddings is generated using an image encoder, and the prompt embedding is generated using a text encoder. In some embodiments, the image encoder and text encoder have been trained to generate vectors in a shared vector space. In some embodiments, the image encoder and text encoder have been trained to generate closely aligned vectors in a shared vector space for images and textual descriptions that are semantically related. In some embodiments, the image encoder and text encoder have been trained to generate vectors in a shared vector space that minimize a contrastive loss function for images and textual descriptions that are semantically related.

In some embodiments, identifying an image embedding corresponding to the prompt embedding includes generating a similarity score indicating a level of alignment between an image embedding from the set of image embeddings and the prompt embedding using at least one of a cosine similarity, a Euclidean distance, or a Manhattan distance between the image embedding and the prompt embedding.

According to some aspects, a system for generating a video bookmark is provided. The system can include a memory, and a processing device, coupled to the memory, to perform operations including receiving a prompt comprising a description associated with a target scene within a video, generating a prompt embedding from the received prompt, identifying, based on a set of image embeddings each corresponding to a frame of the video, an image embedding corresponding to the prompt embedding, and generating a video bookmark at a frame associated with the identified image embedding.

According to some aspects, a non-transitory computer readable storage medium is provided. The non-transitory computer readable storage medium can comprise instructions that, when executed by a processing device, causes the processing device to perform operations including receiving a prompt comprising a description associated with a target scene within a video, generating a prompt embedding from the received prompt, identifying, based on a set of image embeddings each corresponding to a frame of the video, an image embedding corresponding to the prompt embedding, and generating a video bookmark at a frame associated with the identified image embedding.

BRIEF DESCRIPTION OF THE DRAWINGS

Aspects and embodiments of the present disclosure will be understood more fully from the detailed description given below and from the accompanying drawings of various aspects and embodiments of the disclosure, which, however, should not be taken to limit the disclosure to the specific aspects or embodiments, but are for explanation and understanding only.

FIG. 6 illustrates a flow diagram of an example method for generating a video bookmark, in accordance with some embodiments of the present disclosure.

DETAILED DESCRIPTION

Figure 1:
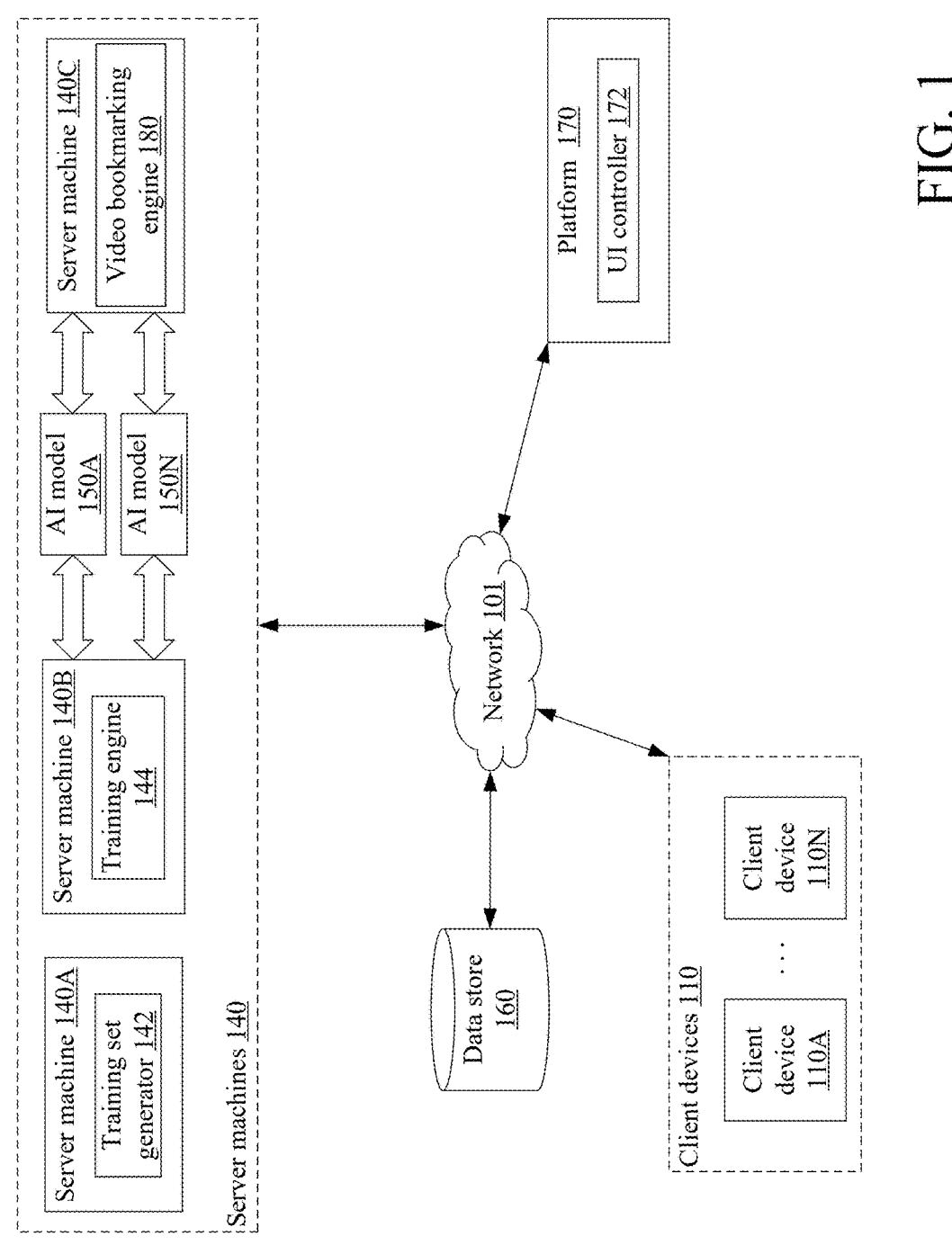
FIG. 1 illustrates an example system architecture capable of supporting video bookmarking in accordance with embodiments of the present disclosure.

Traditionally, to generate a bookmark (or time localization), a creator or editor of a video can manually search a video, pause the video at a desired time stamp (e.g., corresponding to a frame of the video), create the bookmark, then finally, provide a title for the bookmark. The creator or editor can then repeat such a process to create multiple bookmarks for points or frames along the entire video.

Such a process is tedious, and leads to an increase in time for creating bookmarks, particularly if a user is uploading many, or longer, videos. This can cause frustration for the user and further burden the user with additional tasks that unnecessarily consume computing resources, thereby decreasing overall efficiency and increasing overall latency of a content sharing platform. In some cases, such a problem can negatively impact usage and adoption of videos at a content sharing platform.

Aspects and embodiments of the present disclosure address these and other challenges of modern video bookmarking by providing systems and methods for intelligently creating one or more bookmarks within a video, with the aid of a visual-language model (or other similar artificial intelligence (AI) models). According to embodiments of the present disclosure, a video-editing tool can include a bookmarking engine which can intake a prompt from a user and place a bookmark at an identified frame (or point) within a corresponding video, according to descriptive content within the prompt. In embodiments, the bookmarking engine can leverage the visual language model to embed both the user prompt (e.g., textual data), and video frames (e.g., image data) of the corresponding video into a shared vector space. The bookmarking engine can then compare the embedded prompt against one or more of the frame embeddings (e.g., image embeddings of images or video frames), to identify visual content relevant to the prompt. From similarities that are drawn from the comparisons, one or more video frames can then be identified for bookmark generation.

In embodiments, the bookmarking engine can first intake a prompt from a user. The prompt can include a description of the scene they would like to bookmark. The prompt can also be in natural language. For example, a user can input text into a chat interface of the video-editing tool, such as, "Create a bookmark in the scene where protagonist starts to walk into a forest."

After intaking, the prompt can be embedded through a text encoder (e.g., of the visual language model), to produce an embedded prompt (or prompt embedding). The prompt embedding can be a corresponding vector (e.g. an embedding) in a vector space. Such a resulting vector can encapsulate the semantic and contextual meaning of the original user prompt.

In addition to the above process (e.g., in parallel or previously), the corresponding video can be processed to produce content embeddings of at least some of the frames pertaining to the video. To begin, raw video data (e.g., a set of sequential frames corresponding to video) can be processed using frame downsampling to produce a subset of the frames (e.g., every nth frame can be selected, where n is a predetermined downsampling factor). Such a data reduction technique can aid in reducing processing time. As will be discussed below, more complex techniques can be used.

A video encoder of the visual language model can then embed the downsampled set of frames of the video into a similar vector space as the embedded prompt. Thus, the frames can be mapped to a corresponding vector representation (e.g., one embedding per frame) in a vector space. Each of these embeddings can capture the visual content and contextual information of its respective frame in the vector space.

The bookmarking engine can then identify the image frame (e.g., a matching frame) whose embedding is most similar to the embedded prompt, and output the index of such a matching frame. In embodiments, this can be done by finding the frame that minimizes the distance to the textual prompt in the embedding space. The resulting image frame can then be identified as the one that is semantically most related to the textual prompt. In such a way, the video editing tool can identify a single frame, that is most likely within the segment the user would like to bookmark. Accordingly, a video bookmark can be intelligently created from limited user input.

Advantages of implementing such a video bookmarking engine include, but are not limited to, reducing the time needed to generate a video bookmark, thereby reducing unnecessary consumption of computing resources, increasing overall efficiency and decreasing overall latency of a content sharing platform. This is achieved by streamlining and automating the process for video creators and editors, which can further enable the generation of additional video bookmarks due to the added efficiency. Furthermore, the system facilitates an intuitive interface for users, due to the system's intake of natural language text and prompts. Additionally, the ability to efficiently generate video bookmarks can result in the association of more specific and additional bookmarks (and metadata) with a video. This enhancement can lead to improved quality in categorization, labeling, tagging, and intra-video searching by viewers.

FIG. 1 illustrates an example system architecture capable of supporting video bookmarking in accordance with some embodiments of the present disclosure. The system architecture 100 (also referred to as "system" herein) can include client devices 110 or 110A-N, a data store 160, a video streaming platform 170, and/or server machines 140A-C, each connected to a network 101.

In some embodiments, video streaming platform 170, server machines 140A-C, client device 110, and data store 160 can include, can be, or can otherwise be connected to one or more computing devices, (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components capable of connecting to system 100. In some embodiments, network 101 can include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof.

In some embodiments, data store 160 can be a persistent storage capable of storing data as well as data structures to tag, organize, and index the platform data. In some embodiments, a data item of platform data can correspond to one or more portions of a content item for display to a content viewer via a graphical user interface (GUI) on a viewing user device 110, in accordance with embodiments described herein. A data item can correspond to metadata for a content item, such as a content item title, transcript, description, length, or content item viewing statistics. In some embodiments, a data item of platform data can correspond to one or more portions of a channel, including channel metadata such as a channel title, channel description, channel uploading user, or channel viewing statistics. Data store 160 can be hosted by one or more storage devices, such as main memory, magnetic or optical storage based disks, tapes or hard drives, NAS, SAN, and so forth. In some embodiments, data store 160 can be a network-attached file server, while in other embodiments the data store 160 can be some other type of persistent storage such as an object-oriented database, a relational database, and so forth, that can be hosted by platform 160 or one or more different machines coupled to the platform 160 via network 101.

The client devices 110A-N can each include computing devices such as personal computers (PCs), laptops, mobile phones, smart phones, tablet computers, netbook computers, network-connected televisions, etc. Each client device 110 can include a content viewer. In some embodiments, a content viewer can be an application that provides a user interface (UI) for users to view or upload content, such as images, video items, web pages, documents, etc. For example, the content viewer can be a web browser that can access, retrieve, present, and/or navigate content (e.g., web pages such as Hyper Text Markup Language (HTML) pages, digital content items, etc.) served by a web server. The content viewer can render, display, and/or present the content to a user. The content viewer can also include an embedded media player (e.g., a Flash® player or an HTML5 player) that is embedded in a web page (e.g., a web page that can provide information about a product sold by an online merchant). In another example, the content viewer can be a standalone application (e.g., a mobile application or app) that allows users to view digital content items (e.g., digital video items, digital images, electronic books, etc.). According to aspects of the disclosure, the content viewer can be a content platform application for users to record, edit, and/or upload content for sharing on platform 170. As such, the content viewers and/or the UI associated with the content viewer can be provided to client devices 110A-N by platform 170. In one example, the content viewers can be embedded media players that are embedded in web pages provided by the platform 170.

Platform 170 can include one or more channels. A channel can include metadata about the channel, and one or more content items available from a common source, or content items having a common topic, theme, or substance. The metadata can include information about the channel, such as a title, description, date, user uploader, usage statistics, or content language. In some embodiments, the metadata can include information about the content items of the channel, such as a respective content item's title, description, date, identity of channel owner, usage statistics, or language.

A channel can represent one or more content items (e.g., digital content) chosen by a user, digital content made available by a user, digital content uploaded by a user, digital content chosen by a content provider, digital content chosen by a broadcaster, etc. For example, a channel X can include videos Y and Z. A channel can be associated with an owner, who is a user that can perform actions on the channel. Different activities can be associated with the channel based on the owner's actions, such as the owner making digital content available on the channel, the owner selecting (e.g., liking) digital content associated with another channel, the owner commenting on digital content associated with another channel, etc. The activities associated with the channel can be collected into an activity feed for the channel. Users, other than the owner of the channel, can subscribe to one or more channels in which they are interested. The concept of "subscribing" can also be referred to as "liking," "following," "friending," and so on.

A content item can be consumed via the Internet or via a mobile device application, such as a content viewer of viewing client devices 110A-N. In some embodiments, a content item can correspond to a media file (e.g., a video file, an audio file, a video stream, an audio stream, etc.). In other or similar embodiments, a content item can correspond to a portion of a media file (e.g., a portion or a chunk of a video file, an audio file, etc.). As discussed previously, a content item can be requested for presentation to the user by the user of the platform 170. As used herein, "content item" can include an electronic file that can be executed or loaded using software, firmware or hardware configured to digitally present the content item to an entity. As indicated above, in at least one embodiment, the platform 170 can store the content items (in one or more formats), or references to the content items, using the data store 160.

In some embodiments, a content item can be a video item. A video item refers to a set of sequential video frames (e.g., image frames) representing a scene in motion. For example, a series of sequential video frames can be captured continuously or later reconstructed to produce animation. Video items can be provided in various formats including, but not limited to, analog, digital, two-dimensional and three-dimensional video. Further, video items can include movies, video clips, video streams, or any set of images (e.g., animated images, non-animated images, etc.) to be displayed in sequence. In some embodiments, a video item can be stored (e.g., at data store 160) as a video file that includes a video component and an audio component. The video component can include video data that corresponds to one or more sequential video frames of the video item. The audio component can include audio data that corresponds to the video data.

In some embodiments, platform 170 and/or server machines 140 can be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that can be used to provide users with access to channels and/or content items, and allow users to perform video content searches. For example, platform 170 can include a user-facing webpage. Platform 170 can also include back-end software that can be used to provide users with access to channels and/or content items, and allow users to perform video content searches.

In some embodiments, a video streaming platform, (e.g. platform 170) can use a video bookmarking engine 180 to create one or more bookmarks within a video using one or more AI models 150. According to embodiments of the present disclosure, the video bookmarking engine 180 can intake a prompt from a user and place a bookmark at an identified frame (or point) within a corresponding video, according to descriptive content within the prompt. Video bookmarking engine 180 can be hosted by server machine 140C, which can be part of platform 170 or another platform or system. Platform 170 can also use a user-interface (UI) controller 172 to provide UIs for presentation on client devices 110A-N (e.g., using a content viewer).

The UIs can present and/or play content items, and receive user input pertaining to the content items. In an example, in the case of video bookmarking, platform 170 can receive data indicative of the desired video time-localization for a bookmark, video bookmark label, or any other bookmarking command (such as a text-based or natural language description, as will be further described below), and work with the other components of the system to effect the user bookmarking request. For example, in some embodiments, when a user provides a query to the video streaming platform with the intent of placing a video bookmark, video bookmarking engine 180 can employ downsampling, data embedding, comparison indexing, and upsampling capabilities, to generate a response (e.g., a bookmark) to such a type of request. Video bookmarking engine 180 can use one or more AI models 150A-N to determine placement of a bookmark within a video. The AI models 150A-N can include one or more of decision trees, random forests, support vector machines, or other types of machine learning models. In one embodiment, such AI models can include one or more artificial neural networks (also referred to simply as a neural network). The artificial neural network can include a feature representation component with a classifier or regression layers that map features to a target output space. The artificial neural network can be, for example, a convolutional neural network (CNN) that can include a feature representation component with a classifier or regression layers that map features to a target output space, and can host multiple layers of convolutional filters. Pooling can be performed, and non-linearities can be addressed, at lower layers, on top of which a multi-layer perceptron can be commonly appended, mapping top layer features extracted by the convolutional layers to decisions (e.g., classification outputs). The neural network can further be a deep network with multiple hidden layers or a shallow network with zero or a few (e.g., 1-2) hidden layers. Deep learning can use a cascade of multiple layers of nonlinear processing units for feature extraction and transformation. Each successive layer can use the output from the previous layer as input. In deep learning, each level learns to transform its input data into a slightly more abstract and composite representation.

In some embodiments, the AI models 150A-N can include one or more recurrent neural networks (RNNs). An RNN is a type of neural network that includes a memory to enable the neural network to capture temporal dependencies. An RNN is able to learn input-output mappings that depend on both a current input and past inputs. The RNN can address past and future measurements and make predictions based on this continuous measurement information. One type of RNN that can be used is a long short term memory (LSTM) neural network.

The AI models 150A-N can include at least one generative AI model, such as a large language model (LLM) allowing for the generation of new and original content. A generative AI model can include aspects of a transformer architecture, or a GAN architecture. Such a generative AI model can use other machine learning models including an encoder-decoder architecture including one or more self-attention mechanisms, and one or more feed-forward mechanisms. In some embodiments, the generative AI model can include an encoder that can encode input textual data into a vector space representation; and a decoder that can reconstruct the data from the vector space, generating outputs with increased novelty and uniqueness. The self-attention mechanism can compute the importance of phrases or words within a text data with respect to all of the text data. A generative AI model can also utilize the previously discussed deep learning techniques, including recurrent neural networks (RNNs), convolutional neural networks (CNNs), or transformer networks. A generative AI model can be pre-trained on a large corpus of data so as to process, analyze, and generate human-like text based on given input. Any of the AI models can have any typical architecture for LLMs, including one or more architectures as seen in Bidirectional Encoder Representations from Transformers (BERT), Generative Pre-trained Transformer series (Chat GPT series LLMs), or leverage a combination of transformer architecture with pre-trained data to create coherent and contextually relevant text.

According to aspects of the present disclosure, the AI models 150A-N together with the video bookmarking engine (and optionally UI controller 172) can be hosted on the cloud (e.g., using cloud resources associated with platform 170), at data center associated with platform 170, or on client devices 110A-N. In some embodiments, any of the AI models 150A-N can be a self-hosted AI model, or in other embodiments, can be an external AI model only accessed by an API.

AI models 150A-N can be trained using training data. In embodiments, server machine 140A can include a training set generator 142 that is capable of generating training data (e.g., a set of training inputs and a set of target outputs) to train the AI models 150A-N. AI models 150A-N can implement, or be formed, from a two-branch, or twin, architecture consisting of a text encoder and an image encoder. Training data can be associated with training either encoder of the AI model to generate an embedding (i.e., embed an input), based on any combination of metadata, question language, image data, video frame data, and/or external information (not shown in FIG. 1). In embodiments, the user query can be formed in natural language.

Training set generator 142 can accept a combination of an image and a textual data correlated with the image as training input data to generate a training corpus for the AI model(s) 150A-N. Training set generator 142 (or another component of system 100) can store the generated corpus of training data at data store 160. In some embodiments, training set generator 142 can generate training data that can be used to refine an already trained model (e.g., AI model 150A). In some embodiments, training set generator 142 can generate training data that can be used to train an LLM. In some embodiments, training input data can be populated with historical variations of data. In some embodiments, training set generator 142 can attach various textual training labels to training input imaged data (or vice-versa) used to generate training data.

In some embodiments, model training can be supervised, and each set of training data can include a subset of training inputs and target outputs based on the identified data. To train a model using supervised training, training set generator 142 can generate training data including a subset of training inputs and a subset of target outputs. The subset of training inputs can include image data and correlated textual data. In some embodiments, model training can be unsupervised. To train a model using unsupervised training, training set generator 142 can generate training data by clustering groups of correlated image data and textual data (e.g., included in data store 160) based on similarities between the image data and textual data, through dimensionality reduction by reducing the number of features in the data while retaining as much relevant information about the image data and/or textual data as possible, by generating synthetic or partially synthetic data that resembles the original data, through anomaly detection by identifying parts of content items that are significantly different from the rest of the data, or through data augmentation by applying mathematical transformations to the training dataset.

Server machine 140B can include a training engine 144. Training engine 144 can train text encoders and image encoders of a visual-language AI model (e.g., AI models 150A-N) using the training data from training set generator 142. In some embodiments, the AI model(s) 150A-N can refer to the model artifact that is created by the training engine 144 using the training data that includes training inputs and corresponding target outputs (correct answers for respective training inputs). The training engine 144 can find patterns in the training data that map the training input to the target output (the correct embedding) and provide the AI model(s) 150A-N that captures these patterns.

Each AI model 150A-N can employ a two-branch, or twin, architecture consisting of a text encoder and an image encoder. The text encoder and image encoder can have been trained in tandem and can form a pair. Each encoder can be pre-trained and designed to convert their respective inputs (e.g., image data or text data) into a vector space (e.g., embeddings). Both encoders can embed their respective inputs into a shared vector space, such that the embeddings can be compared, contrasted, processed, etc., within that vector space.

Each encoder can be composed of, e.g., one or more layers of linear and/or non-linear operations (e.g., a support vector machine (SVM) or a deep network, e.g., a machine learning model that is composed of multiple layers of non-linear operations). An example of a deep network is a neural network with one or more hidden layers. Such a machine learning (or AI) model can be trained by, for example, adjusting weights of a neural network in accordance with a backpropagation learning algorithm or the like.

In some embodiments, the AI model(s) 150A-N can be implemented as a visual-language model capable of multi-modal functionalities.

In other or similar embodiments, the AI model 150A-N can refer to the model artifact that is created by training engine 144 using training data that includes training inputs. Training engine 144 can find patterns in the training data, identify clusters of data that correspond to the identified patterns, and provide the AI model 150A-N that captures these patterns. The AI model 150A-N can use one or more of support vector machine (SVM), Radial Basis Function (RBF), clustering, supervised machine learning, semi-supervised machine learning, unsupervised machine learning, k-nearest neighbor algorithm (k-NN), linear regression, random forest, neural network (e.g., artificial neural network), a boosted decision forest, etc.

In some embodiments, training engine 144 can train the AI models 150A-N using a generative adversarial network (GAN). A GAN can consist of two neural networks, where one neural network is a generative AI model, and the other neural network is a discriminative AI model. GAN can cause each of the two neural networks to engage in a competitive process against the other neural network. The generative AI model can attempt to synthesize data that is indistinguishable from collected data (e.g., input data to the generative AI model), and the discriminative AI model can attempt to differentiate between collected data and synthesized data. GAN training can iteratively refine the output of the generative AI model to align to the collected dataset more closely. In some embodiments, training engine 144 can train the AI models 150A-N using a variational autoencoder (VAE), which can introduce probabilistic encoding to represent input data. The probabilistic encoding can be processed through one or more layers and then decoded to reconstruct a generative output. In this way, VAE can be used to train the AI models 150A-N to learn latent configurable representations of data (e.g., the probabilistic encoding through various layers). Output from the AI models 150A-N trained using VAE can be continuously reconfigured based on the latent configurable representations of data.

In some embodiments, platform 170 can include an interface (not shown in FIG. 1) for communicating to and from an AI model(s). In some embodiments, any of the AI models 150A-N can employ a dual encoder architecture. In some embodiments, any of the AI models 150A-N can employ transformer architecture with one or more encoders.

A text encoder of the AI models can encode text, tokens, and/or natural language into a multi-dimensional vector space. An image encoder of the AI models can be a counterpart to the text encoder. An image encoder of the AI models can convert visual data such as image data and video frames, into vectors (e.g., embeddings).

A text and/or image encoder of the AI models 150A-N can employ a transformer-based architecture. A text and/or image encoder of the AI models 150A-N can employ multiple layers of self-attention mechanisms, feed-forward neural layers, and/or transformer layers that allow the encoder to capture both local and global dependencies in the input text or image data. The output of the final layer can serve as the text and/or image embedding. The final outputs of the text encoder and image encoder can share a dimensionality of the embedding space, such that image data and textual data are represented with embeddings that can be directly compared to each other or used in other common operations.

The architecture of either encoder can be selected in view of constraints of the computing machines to be used for inference processing (e.g., available memory and processing power). The number of transformer (or other) layers can be adjusted to trade-off between computational complexity and representational power. The dimensionality of the embeddings and the number of attention heads can be fine-tuned based on the task and resources at hand.

In embodiments, at least one encoder can employ an architecture that is different from a transformer-based architecture. The text encoder can include one or more recurrent neural networks (RNNs) or Long Short-Term Memory (LSTM) blocks in place of, or in addition to, transformer blocks. Specialized attention mechanisms, such as axial attention or sparse attention, can be employed to improve the model's efficiency or to enable the model to handle longer sequences of text. Other techniques such as layer normalization, skipped connections, dropout layers, forms of regularization, etc., can also be applied to improve encoder performance.

Both encoders of an AI model can be pre-trained to align embeddings of semantically related text and images in a shared vector space. The training process can train both encoders simultaneously, such that they form one model.

During training, a dataset including batches or positive image-text pairs, and negative image-text pairs can be used. Each positive pairs can include text data (e.g., natural language passage, word, token, etc.), and correlated image data. Positive pairs can indicate a pair where the text and image are semantically related. Negative pairs, in which the text and image are unrelated, can also be included within the dataset, for more efficient training. Varying sampling strategies for selecting positive and negative pairs can be employed (e.g., hard negative mining).

During training, both the text encoder and the image encoder can forward propagate their respective inputs (e.g., through architectures discussed above) and produce embeddings. Embeddings can be vectors. Alternatively, embeddings can be matrices, tensors, or objects of any other form of output as is feasible and prudent to employ.

The training process can employ a contrastive loss function to evaluate similarity of the embeddings. For a positive image-text pair, the contrastive loss can be used to minimize or decrease the distance between the produced text and image embeddings in the shared space. The same loss function can be used to maximize (or increase the distance between each text embedding and all unrelated image embeddings in a training batch (e.g., all other possible negative image-text pairs). The loss function can ensure an AI model learns to cluster semantically related text and image embeddings, while pushing apart unrelated embeddings.

During training, after such a loss is calculated, backpropagation can be performed to update encoder parameters according to an optimization and training regime (e.g., using a suitable learning rate). Such a process can repeat until an adequate performance is achieved (as quantified by the loss function).

The contrastive loss can be a distance metric. In embodiments, a distance metric such as Euclidean distance, cosine similarity, Manhattan distance, and/or the like, or weighted variations of one or more such metrics can be used. Alternatively, other types or combinations of loss functions can be used. A margin loss function, a least-squares loss function, a hinge loss function, a triplet loss function, etc., can be used.

It should be noted that in some embodiments, the functions of server machines 140A-C or platform 170 can be provided by a fewer number of machines. For example, in some embodiments the server machines 140A-C can be integrated into a single machine, while in other embodiments the server machines 140A-C can be integrated into multiple machines. In addition, in some embodiments one or more of server machines 140A-C can be integrated into 170. In some embodiments, one or more of server machines 140A-C can be integrated separately from platform 170.

In general, functions described in embodiments as being performed by platform 170 and/or server machines 140A-C can also be performed on the client devices 110 in other embodiments, if appropriate. In addition, the functionality attributed to a specific component can be performed by different or multiple components operating together. Platform 170 can also be accessed as a service provided to other systems or devices through appropriate application programming interfaces, and thus is not limited to use in websites.

While the components of the system are described separately, it should be understood that the functionalities can be divided differently or integrated in various ways within the system while still applying similar functionality for the system. Furthermore, each component or server machine can be implemented in various forms, such as standalone applications, web-based platforms, integrated systems within larger software suites, or dedicated hardware devices, just to name a few possible forms.

It is appreciated that in some embodiments, platforms 170, machines 140A-C, and/or data store 160, or client devices of the system (e.g. client devices 110), can each include an associated API, or mechanism for communicating with APIs. In such a way, any of the components of system 100 can support instructions and/or communication mechanisms that can be used to communicate data requests and formats of data to and from any other component of system 100, in addition to communicating with APIs external to the system (e.g., not shown in FIG. 1).

In some embodiments of the disclosure, a "user" can be represented as a single individual. However, other embodiments of the disclosure encompass a "user" being an entity controlled by a set of users and/or an automated source. For example, a set of individual users federated as a community in a social network can be considered a "user." In another example, an automated consumer can be an automated ingestion pipeline, such as a topic channel.

In situations in which the systems, or components therein, discussed here collect personal information about users, or can make use of personal information, the users can be provided with an opportunity to control whether the system or components collect user information (e.g., information about a user's social network, social actions or activities, profession, a user's preferences, or a user's current location), or to control whether and/or how to receive content from the system or components that can be more relevant to the user. In addition, certain data can be treated in one or more ways before it is stored or used, so that personally identifiable information is removed. For example, a user's identity can be treated so that no personally identifiable information can be determined for the user, or a user's geographic location can be generalized where location information is obtained (such as to a city, ZIP code, or state level), so that a particular location of a user cannot be determined. Thus, the user can have control over how information is collected about the user and used by the system and components.

Figure 2:
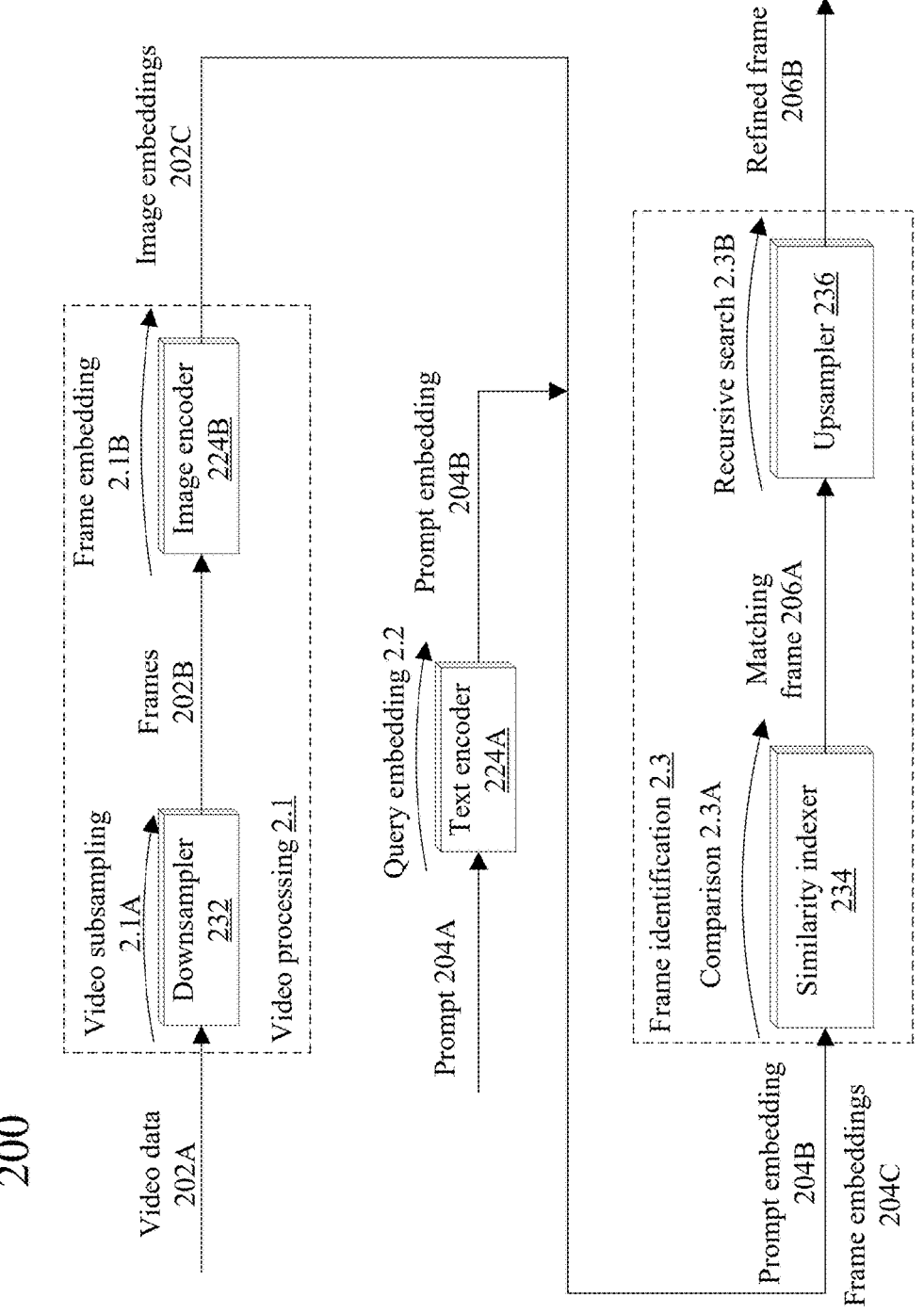
FIG. 2 illustrates an example process for processing a content description to generate a video bookmark, in accordance with some embodiments of the present disclosure.

FIG. 2 illustrates an example process 200 for processing a content description to generate a video bookmark, in accordance with one embodiment of the present disclosure. In embodiments, similar components and functionalities as were described with respect to FIG. 1 can be used in the process 200 illustrated in FIG. 2. Process 200 can use an image encoder 224B and textual encoder 224A of an AI model, a downsampler 232 and upsampler 236, and similarity indexer 234 for comparing embedding similarities. As illustrated by FIG. 2, in some embodiments, the process 200 can intake a user prompt 204A and a given video (data) 202A, for placing a video bookmark. Process 200 can return a frame (or small set of frames) for generating a video bookmark.

The process can begin at operation 2.1, video processing. Operation 2.1 can intake video content data (e.g., video data 202A), specified by a user, and output embeddings corresponding to frames of the video (e.g., frame embeddings 204C). The specified video data 202A can include a visual component representing a sequence of digital images (e.g., video frames) displayed in a temporal order. Each frame can be a still image. The sequence can have a frame rate, resolution, and other characteristics of video data. Video data 202A can also include an audio component representing audio data of the video (e.g., one or more audio streams of the video).

Video data 202A can be compressed using a suitable video compression, e.g., H.264, H.265, VP9, MPEG, AVI, WMV, MOV, etc., and/or any other suitable video format or compression standard. In embodiments, video data 202A can be transmitted as raw data, including raw data matrices and/or pixel values. In embodiments, video data 202A can be represented as a multidimensional array, a tensor, or another similar data structure.

In embodiments, video data 202A can include a large collection of frames, and subsampling operation 2.1A can be employed to narrow the data. For example, the subsampling operation can aim to create a representative, less resource-intensive, collection of frames 202B to allow for more efficient downstream processing. Subsampling can be beneficial in cases where considerable amounts of high-density video data are involved.

In alternate embodiments, operation 2.1A can be skipped or selectively employed. Operation 2.1A can include a downsampler 232 which can intake raw video data frames (e.g., a set of sequential frames of the video) and perform subsampling to produce a subset of the total sequence of frames. In embodiments, a uniform subsampling can be performed at operation 2.1A. For example, the downsampler can iterate through the total sequence of frames within video data 202A, and select every $N^{th}$ frame, for further processing. "N" can be a predetermined subsampling factor. In embodiments, "N" can be selected based on the computational resources available, the number of video frames to be processed, as well as other factors. In embodiments, other frames can be ignored, and the subsampled frames can be output as frames 202B.

In alternate embodiments, more complex mechanisms for subsampling can be employed. More sophisticated algorithms can identify changes in content from frame to frame (e.g., an algorithm including optical flow vectors). Thus, key elements in a video sequence can be retained. Such algorithms can ensure the frames pertaining to key elements are not discarded during subsampling. Such algorithms can make use of features such as individual frame analysis, feature extractors, image transforms (e.g., Fourier or Wavelet transforms, optical flow detection, etc.), in efforts to identify interesting or significant frames to include in frames 202B.

In some embodiments, the subsampling (e.g., uniform subsampling or the subsampling based on the feature extraction) can be defined based on computational constraints (e.g., available computational resources of a hardware device performing the subsampling).

Downsampler 232 can also include buffer management capabilities (to temporarily hold frames before passing them onto the next processing stage), thus ensuring a smooth flow of video data within the system. Other methods and strategies for frame subsampling can be employed while maintaining the overall operational objectives.

Operation 2.1B of process 200 can leverage the image encoder 224B to produce embeddings 202C of the frames 202B. As discussed with respect to FIG. 1, the frames can be transformed, or embedded, from their original vector space to a latent, or multi-dimensional, vector space. Embeddings 202C can be output for comparison with embedding 204B, which can be embedded into the same vector space, as will be discussed below.

Each frame of frames 202B can give rise to a unique frame embedding 202C. Embeddings 202C can serve as compact representations of their corresponding frames 202B. The embeddings can encapsulate the essential visual characteristics of each frame. Embeddings 202C can be significantly smaller in size than the original frames 202B, facilitating more efficient data storage, transmission, and analysis.

Operation 2.2 of process 200 can intake a user prompt 204A associated with the video data 202A. The prompt can be provided by a user as a text input or a voice input, which is converted into text (e.g., by speech-to-text conversion software). The prompt can contain a description associated with a target scene (e.g., a scene within the video that should be used for bookmark generation). An example prompt can include a description of a target scene (e.g., "Create a bookmark in the scene where protagonist starts to walk into a forest."). Other prompt examples can include a description of a sentiment (e.g., funny, sad, etc.) or a graphical indication of a sentiment (e.g., 😊, 🙁, etc.), or description of a subject being discussed during a video segment.

As discussed with respect to FIG. 1, text encoder 224A can correspond, or be paired with image encoder 224B. Text encoder 224A and image encoder 224B can have been pre-trained in tandem. Text encoder can intake prompt 204A and produce a corresponding prompt embedding 204B.

The generated image embeddings 202C and prompt embeddings 204B can then be used as input for operation 2.3 that performs frame identification. Frame identification can include operation 2.3A, comparison, and optionally operation 2.3B, recursive search.

Operation 2.3A can include a similarity indexer 234. The similarity indexer can perform a comparison between the multiple frame embeddings and the prompt embedding 204B. The similarity indexer 234 can generate a similarity score between the prompt embedding 204B and every frame embedding of frame embeddings 204C. As mentioned, prompt embedding 204B and frame embeddings 204C can exist within the same vector space (e.g., be of similar dimensionalities). The frame embedding of embeddings 204C with the highest similarity score, which indicates that the respective frame is most closely aligned with the prompt semantically, can be selected and output as matching frame 206A.

As mentioned previously, a similarity score can be a distance metric. These can include Euclidean distance, cosine similarity, Manhattan distance, weighted variations of such, etc. More specialized similarity functions or combinations of such can be employed. These can include inverse cosine similarity score (e.g., where the inverse cosine function is applied to the cosine similarity). This can convert the cosine similarity to distances that obey the triangle inequality. This can be useful for comparisons and further processing. These are example representations for computing similarities, and various other representations are possible for computing similarities.

In some embodiments, matching frame 206A can be used to generate a bookmark. Alternatively, matching frame 206A can be used as input for operation 2.3B.

Operation 2.3B of process 200 can be selectively employed. Operation 2.3B can be employed to perform a recursive search of the frames surrounding matching frame 206A. This can refine the search for a matching frame with increased granularity.

In embodiments, upsampler 236 can perform multiple functions. Upsampler 236 can identify the neighboring frames of matching frame 206A. As discussed above, matching frame 206A can be selected following the subsampling process—e.g., frame 206A can be selected from a group of frame embeddings selected from a group of frames that have been subsampled. As such, operation 2.3B can gather a (predetermined) number of frames that are temporally adjacent to the frame 206A, in the original video sequence. These frames can form the neighboring frame set of matching frame 206A.

After neighboring frames of matching frame 206A have been identified, a limited (e.g., recursive) version of the process 200 can be applied to the identified neighboring frame set. At each iteration, upsampler 236 can identify further matching frames, from the identified unprocessed frames. Such a process can be repeated recursively with the newly included frames serving as new reference points, thus gradually expanding the identified set of semantically similar frames. In such a way, operation 2.3B can perform a search for further aligned frames, with decreased granularity or increased refinement. Some embodiments of upsampling operations will be described in greater detail below in conjunction with FIG. 4.

Once recursive search 2.3B has ended, either through reaching a user-set threshold or reaching a previously specified level of granularity, the refined frame 206B can be output, and a video bookmark can be generated at that frame.

Figure 3:
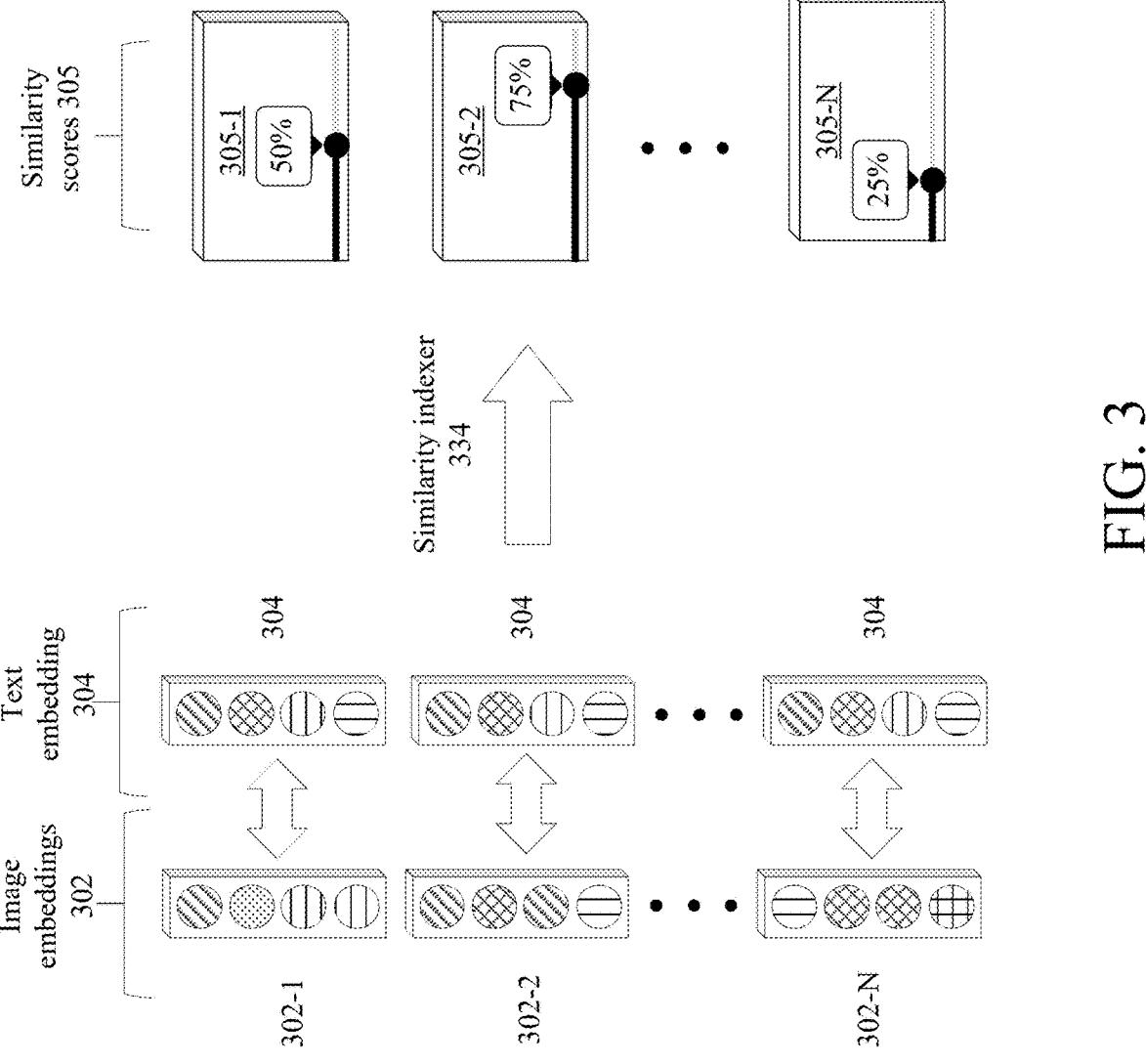
FIG. 3 illustrates an example comparison process associated with video bookmarking in accordance with some embodiments of the present disclosure.

FIG. 3 illustrates an example comparison process associated with video bookmarking in accordance with some embodiments of the present disclosure. In embodiments, similar components and functionalities as were described with respect to FIGS. 1-2 can be used in the process 300 illustrated in FIG. 3. For example, in embodiments, process 300 can include a similarity indexer 334, image embeddings 302, a text embedding 304, and similarity scores 305. Such components can correspond, or be similar, to components and functionalities as seen and described in FIGS. 1-2, and incorporate and augment at least the embodiments described therein.

Image embeddings 302 can include N embeddings corresponding to N frames of subsampled video data. These can be seen as image embeddings 302-1 through 302-N in FIG. 3. (Note that in some embodiments, the video data can not be subsampled, and image embeddings 302 can represent every frame of the video data).

As previously discussed, similarity indexer 334 can process and quantify the similarities between each image embedding, and the text embedding 304. Each embedding of image embeddings 302 can be unique; text embedding 304 can only include one text embedding. Although simplified within FIG. 3, each embedding 302-1 through 302-N, as well as text embedding 304 can be a vector, a tensor, or any other suitable form of a multi-dimensional embedding, etc. As seen in FIG. 3, patterned circles within blocks 302-1 through 302-N and 304 depict individual components (elements) or groups of components of the embeddings. Some embeddings can include similar elements. These can be used to calculate similarity scores 305 (note the example seen in FIG. 3 is highly simplified). For example, image embedding 302-$j$ can be an M-component vector, I=($I_1$, $I_2$, . . . $I_M$), where M is the dimensionality of the embedding space, and text embedding 304 can be a vector T=($T_1$, $T_2$, . . . $T_M$). The similarity score can be computed as the dot-product (scalar product) of the two embeddings, e.g., $$S(I, T) = \frac{I \cdot T}{|I||T|}$$

where I·T=($I_1T_1$+$I_2T_2$+ . . . $I_MT_M$), and |I| and |T| stand for the absolute values (lengths) of the respective embeddings (e.g., $|I|^2$=I·I).

In some embodiments, embedding 302-1 can include two out of four similarly patterned circles as text embedding 304. In such a simplified example, similarity indexer 334 might compute a corresponding similarity score 305-1 of 50%. As seen in image embedding 302-2 and text embedding 304, three out of four circles are similarly patterned. In such a case, similarity indexer 334 might compute a similarity score 305-2 of 75%. Such a process can continue so on and so forth for all image embeddings 302. In such a way, similarity scores can be generated for all image embeddings and the text embedding. (Note that FIG. 3 is a highly simplified representation of the operations performed by similarity indexer 334; the embodiments as seen are intended to be exemplary and non-limiting).

Based on the computed similarity scores 305, similarity indexer 334 can output a frame, or an image embedding corresponding to a frame, that most closely aligns with the text embedding.

Figure 4:
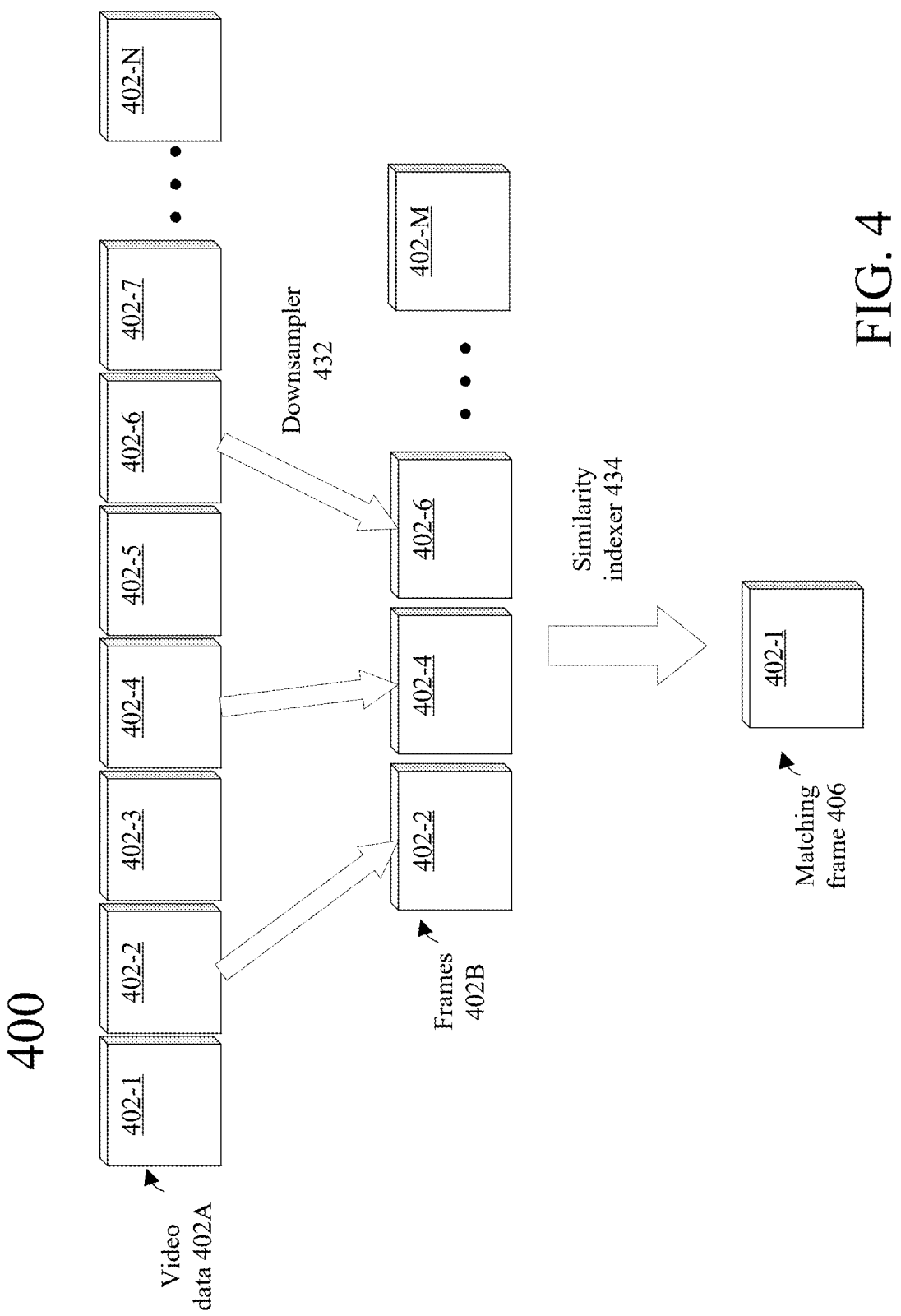
FIG. 4 illustrates an example recursive search process associated with video bookmarking in accordance with some embodiments of the present disclosure.

FIG. 4 illustrates an example recursive search process associated with video bookmarking in accordance with some embodiments of the present disclosure. Components and functionalities, as described with respect to FIG. 4, can correspond, or be similar, to components and functionalities as were described with respect to FIGS. 1-3. Thus, such components and functionalities can incorporate and augment at least the embodiments described therein.

The process 400, as described with respect to FIG. 4 (which can correspond or be similar to subprocess 2.1A of process 200 of FIG. 2), can begin with video data 402A. Data 402A can include a set of images or video frames (e.g., frames 402-1 through 402-N). Downsampler 432 can subsample the video data 402A, to create a subset of frames 402B. As seen within FIG. 4, the frames 402B can be a subset of the larger, comprehensive set of frames belonging to the full video. In some embodiments, a first iteration of the recursive search can identify, using a sparse subsampling (e.g., every Nth frame of the video), a frame whose content is most aligned with the prompt. A second iteration can focus on a certain locale of the identified frame, e.g., an N-frame neighborhood of previously unsampled frames around the identified frame. During the second iteration, every nth frame of the N-frame neighborhood can be sampled, and a new most similar frame can be identified. This process can continue until the recursive search has converged on a small neighborhood of a predetermined number of frames, e.g., one, two, and/or the like. The predetermined number of frames can be sufficiently small so that placement of a bookmark anywhere within these frames would lead to an imperceptible (or barely perceptible) difference to a viewer (e.g., anywhere within 5 frames of a 60 frame-per-second video).

In some embodiments, similarity indexer 434 can analyze the frames via corresponding embeddings, as was described with respect to FIG. 3. Indexer 434 can select a single matching frame 406, that corresponds, or most aligns to, a user prompt (represented via the prompt embedding). As seen in FIG. 4, during initial application, many frames of video data (e.g., 402-1, 402-3, 403-5, etc.) can have not been processed due to subsampling. During the recursive search operation, the upsampler (as described in FIG. 2) can intake the matching frame 406, and analyze the original video data 402A to identify neighboring frames that have not been processed. The upsampler and/or bookmarking engine can then restart the process (e.g., process 200 as described with respect to FIG. 2) recursively to analyze such frames.

In the example seen in FIG. 4, example matching frame 406 is frame 402-I, which can be any frame from frames 402B. For sake of a more specific example, assume that frame 402-I is frame 402-4. Assume frame 402-4 was both selected during subsampling and has been determined to have the highest similarity score and most-align with the text embedding. Since subsampling has been performed, although frame 402-4 can be the frame that most aligns with the textual prompt, a high probability exists that neighboring frames 402-3 or 402-5 can align even more closely with the prompt and encoded textual embedding. Thus, the recursive searching operation can gather the neighboring frames; in this case, at least frame 402-3 and frame 402-5. (In more complex embodiments, more frames can be gathered). The overall process can then be recursively reapplied as described within FIGS. 2-3. Should any of the identified neighboring frames have a higher similarity score than the previously identified matching frame, the matching frame 406 can be updated to be the frame with the new highest similarity score. A more detailed explanation will now be provided.

As seen in FIG. 4 currently, downsampler 432 can reduce the size of video data 402A by two (or simply subsamples every other frame from video data 402A into frames 402B). In some embodiments this subsampling can be more complex. For instance, in embodiments, instead of uniformly selecting one out of every two frames as seen in FIG. 4, one out of every four frames can be selected (e.g., a subsampling factor of four is used). Assume that frames 402-1, 402-5, 402-9, and so on and so forth are subsampled from video data 402A into frames 402B. In such a case, assume frame 402-5 is selected as the matching frame that most closely aligns with the prompt. In embodiments, there can be large number of neighboring frames to be identified and re-processed. With a subsampling factor of four, there can be three unprocessed neighboring frames on each temporal side of matching frame 402-5. Frames 402-2 through 402-4 will be unprocessed as temporally preceding frames, and frames 402-6 through 402-8 will be unprocessed as temporally following frames.

Thus, as a subsampling factor or data reduction technique becomes more complex (as can be necessary with quite large videos and larger numbers of frames), it can become necessary to subsample repeatedly as the recursive search reapplies the frame matching process.

Such a process, and subsampling can need to be repeated a number of times. For instance, systems with limited processing capabilities can need to subsample video data 402A into much smaller groups of frames. Thus, in embodiments, process 200 as described with respect to FIG. 2 can be performed recursively many times. In practice the process can be recursively effected with finer subsets of frames, until a specific frame is found that scores the highest for similarity with the prompt, or text embedding.

Other factors can influence the amount of recursive iterations that occur. For example, the range of temporal adjacency (influenced by the subsampling factor), subsampling strategy, upsampling strategy, size of the video data, computational resources available, user-defined parameters, etc., can be defined according to the needs of the application. As mentioned, in some embodiments the process can not be repeated at all. The process can be modified to meet specific needs of the application.

Thus, recursive searching can be accomplished as a final step in cases when subsampling has been performed. The desire to recursively search and analyze neighboring frames is based in the theory that neighboring frames will share similar contexts, themes, and elements. Should a certain frame have a high similarity score with a prompt embedding, neighboring frames can as well. Such a strategy can increase processing speed. Should each frame to be analyzed individually (e.g., sans subsampling and recursive searching), processing time might increase exponentially. By subsampling and recursively delving into finer levels of granularity, processing time can be increase, computational load can be decreased, and occupying resources can be diminished.

Figure 5:
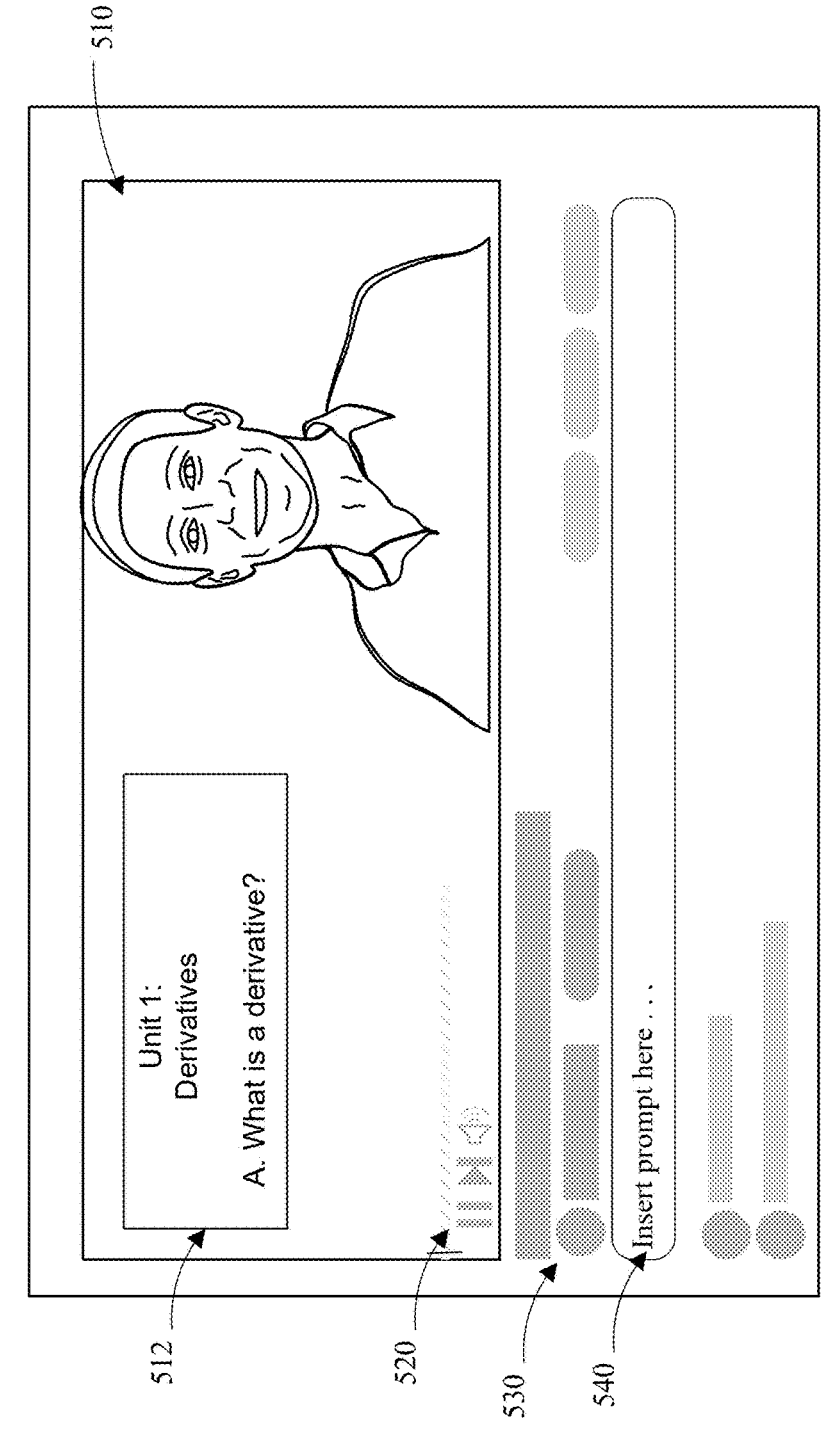
FIG. 5 illustrates an example user interface (UI), in accordance with some embodiments of the present disclosure.

FIG. 5 illustrates an example user interface (UI) for video bookmarking, in accordance with some embodiments of the present disclosure. In some embodiments, UI 500 can include a main region (e.g. main region 510) to display a primary video for user viewing and/or editing. Main region 510 itself can be used to display further information (e.g., as seen in information box 512). Within UI 500, multiple UI elements can be used to display additional information (e.g., subregion 530 below the main region 510 can display comments associated with the video), and to receive user commands (e.g., command buttons or sliders), including a user command to generate a bookmark, etc. It should be understood that numerous other layouts and configurations for UI 500 can exist, and that UI 500 as seen is an example representation of a UI associated with the system.

In some embodiments, UI 500 can correspond to a video-editing mode. In some embodiments, UI 500 can correspond to a bookmark generation mode. As such, the UI 500 can include interactive elements such as a video progress bar 520, buttons for navigating, describing, and otherwise generating a bookmark. Further controls can be included within subregion 530, such as for muting/enabling the audio of a video, adjusting audio volume, switching video layouts, and other actions can be included within UI 500.

As seen in FIG. 5, UI 500 can include an input field 540 to allow a user to input a prompt, for automated generation of a video bookmark, as was described with respect to FIGS. 1-4 and process 200. Thus, the UI 500 can quickly and intuitively allow a user to generate a bookmark at a time localization of a video.

FIG. 6 illustrates a flow diagram of an example method for generating a video bookmark, in accordance with some embodiments of the present disclosure. Method 600 can be performed by processing logic that can include hardware, software, or a combination of both. Processing logic can be part of a processing device that can include one or more central processing units (CPUs), graphics processing units (GPUs), field-programmable gate arrays (FPGAs), application-specific integrated circuits (ASICs), or the like, or any combination thereof. In one embodiment, method 600 can be performed by the video bookmarking engine 131 and the associated algorithms, e.g., as described in conjunction with FIGS. 1-5. In certain embodiments, method 600 can be performed by a single processing thread. Alternatively, method 600 can be performed by two or more processing threads, each thread executing one or more individual functions, routines, subroutines, or operations of the method. In an illustrative example, the processing threads implementing method 600 can be synchronized (e.g., using semaphores, critical sections, and/or other thread synchronization mechanisms). Alternatively, the processing threads implementing method 600 can be executed asynchronously with respect to each other. Therefore, while FIG. 6 and the associated descriptions list the operations of method 600 in a certain order, in some embodiments, at least some of the described operations can be performed in parallel and/or in a different order. In some embodiments one or more operations of method 600 is not performed.

At block 610, processing logic can receive a user prompt including a description associated with a target scene within a video. The description associated with the target scene can be, for example, a description of the target scene, a description of content of the target scene, a description of a sentiment contained within the target scene, graphical representation of a sentiment contained within the target scene, etc.

At block 620, processing logic can generate a prompt embedding from the received prompt. In some embodiments, the prompt embedding can be generated from the received prompt using a text encoder of an AI model.

At block 630, processing logic can identify a set of image embeddings that each correspond to a frame of the video. In some embodiments, each corresponding frame is selected from a plurality of frames of the video according to uniform subsampling and/or subsampling based on feature extraction from the video frames. In some embodiments, the uniform subsampling or the subsampling based on the feature extraction is defined based on computational constraints of a hardware device performing the subsampling. In some embodiments, processing logic generates the set of image embeddings using an image encoder of an AI model. The image encoder and the above text encoder can be part of the same AI model or different AI models and can have been trained to generate vectors in a shared vector space. For example, the image encoder and the text encoder can have been trained to generate closely aligned vectors in a shared vector space for images and textual descriptions that are semantically related. In some embodiments, the image encoder and the text encoder can have been trained to generate vectors in a shared vector space that minimize a contrastive loss function for images and textual descriptions that are semantically related.

At block 640, processing logic can identify, based on the set of image embeddings, an image embedding corresponding to the prompt embedding. In some embodiments, processing logic can identify the image embedding corresponding to the prompt embedding by generating a similarity score indicating a level of alignment between an image embedding from the set of image embeddings and the prompt embedding using, for example, a cosine similarity, a Euclidean distance, and/or a Manhattan distance between the image embedding and the prompt embedding.

In some embodiments, processing logic can identify the image embedding corresponding to the prompt embedding using a recursive search process which can include identi-fying a reference image embedding of the set of image embeddings, where the reference image embedding most closely aligns with the prompt embedding, identifying neighboring frames of a video frame corresponding to the reference image embedding, generating a second set of image embeddings from the identified neighboring frames, and identifying, based on the second set of image embeddings, an image embedding corresponding to the prompt embedding.

At block 660, processing logic can generate a video bookmark at a frame associated with the identified image embedding. In some embodiments, processing logic can present the generated video bookmark in a UI for user information or approval.

Figure 7:
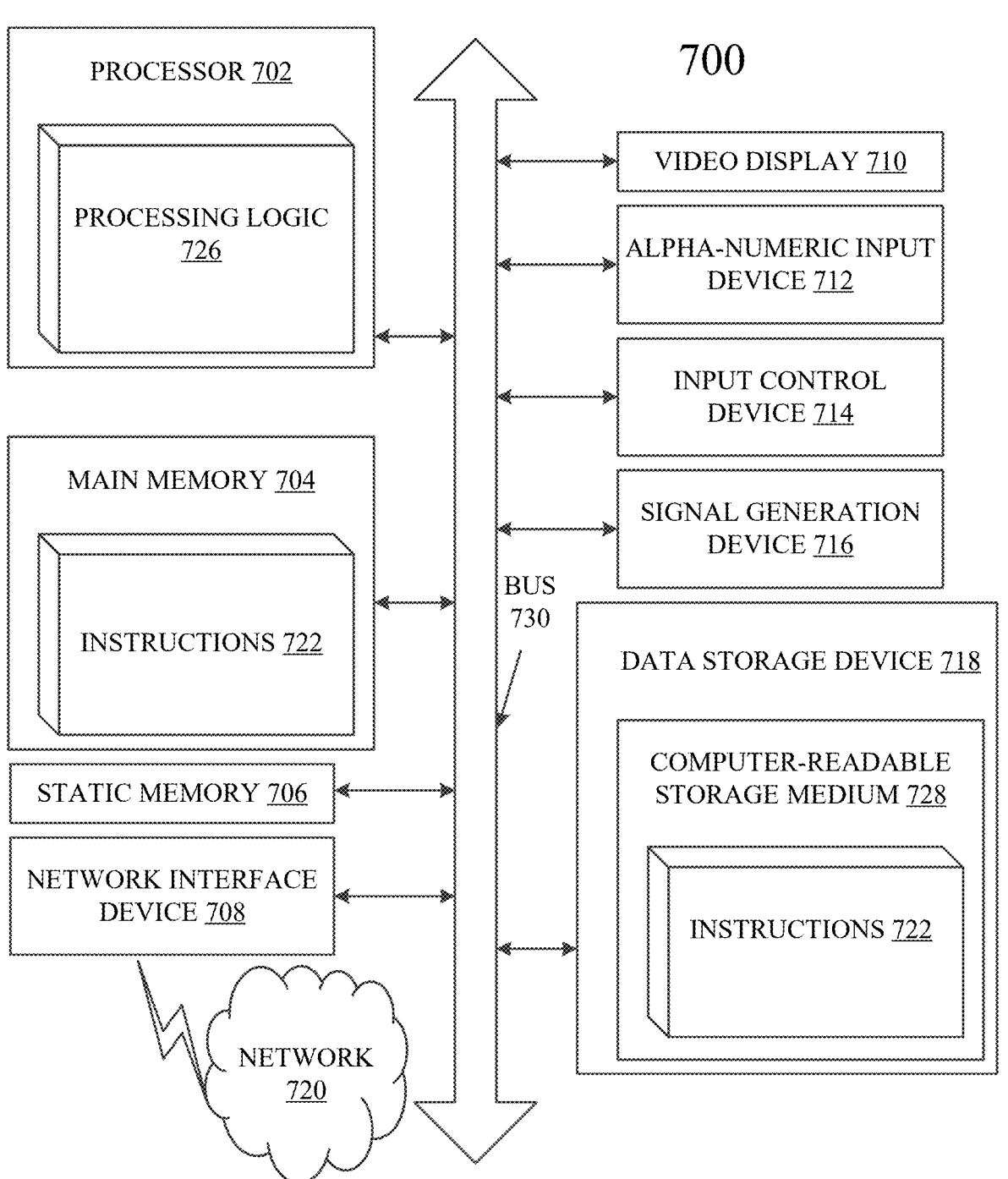
FIG. 7 illustrates a block diagram of an example processing device operating in accordance with one or more aspects of the present disclosure.

FIG. 7 illustrates a block diagram of an example processing device 700 operating in accordance with one or more aspects of the present disclosure. In one embodiment, the processing device 700 can be a part of any computing device of FIG. 1, or any combination thereof. Example processing device 700 can be connected to other processing devices in a LAN, an intranet, an extranet, and/or the Internet. The processing device 700 can be a personal computer (PC), a set-top box (STB), a server, a network router, switch or bridge, or any device capable of executing a set of instructions (sequential or otherwise) that specify actions to be taken by that device. Further, while only a single example processing device is illustrated, the term "processing device" shall also be taken to include any collection of processing devices (e.g., computers) that individually or jointly execute a set (or multiple sets) of instructions to perform any one or more of the methods discussed herein.

Example processing device 700 can include a processor 702 (e.g., a CPU), a main memory 704 (e.g., read-only memory (ROM), flash memory, dynamic random access memory (DRAM) such as synchronous DRAM (SDRAM), etc.), a static memory 706 (e.g., flash memory, static random access memory (SRAM), etc.), and a secondary memory (e.g., a data storage device 718), which can communicate with each other via a bus 730.

Processor 702 represents one or more general-purpose processing devices such as a microprocessor, central processing unit, or the like. More particularly, processor 702 can be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 702 can also be one or more special-purpose processing devices such as an application specific integrated circuit (ASIC), a field programmable gate array (FPGA), a digital signal processor (DSP), network processor, or the like. In accordance with one or more aspects of the present disclosure, processor 702 can be configured to execute instructions (e.g. processing logic 726 can implement video bookmarking engine 131 of FIG. 1).

Example processing device 700 can further include a network interface device 708, which can be communicatively coupled to a network 720. Example processing device 700 can further comprise a video display 710 (e.g., a liquid crystal display (LCD), a touch screen, or a cathode ray tube (CRT)), an alphanumeric input device 712 (e.g., a keyboard), an input control device 714 (e.g., a cursor control device, a touch-screen control device, a mouse), and a signal generation device 716 (e.g., an acoustic speaker).

Data storage device 718 can include a computer-readable storage medium (or, more specifically, a non-transitory computer-readable storage medium) 728 on which is stored one or more sets of executable instructions 722. In accordance with one or more aspects of the present disclosure, executable instructions 722 can comprise executable instructions (e.g. implementing bookmarking engine 131 of FIG. 1).

Executable instructions 722 can also reside, completely or at least partially, within main memory 704 and/or within processor 702 during execution thereof by example processing device 700, main memory 704 and processor 702 also constituting computer-readable storage media. Executable instructions 722 can further be transmitted or received over a network via network interface device 708.

While the computer-readable storage medium 728 is shown in FIG. 7 as a single medium, the term "computer-readable storage medium" should be taken to include a single medium or multiple media (e.g., a centralized or distributed database, and/or associated caches and servers) that store the one or more sets of operating instructions. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

It should be understood that the above description is intended to be illustrative, and not restrictive. Many other embodiment examples will be apparent to those of skill in the art upon reading and understanding the above description. Although the present disclosure describes specific examples, it will be recognized that the systems and methods of the present disclosure are not limited to the examples described herein, but can be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

The embodiments of methods, hardware, software, firmware, or code set forth above can be implemented via instructions or code stored on a machine-accessible, machine readable, computer accessible, or computer readable medium which are executable by a processing element. "Memory" includes any mechanism that provides (i.e., stores and/or transmits) information in a form readable by a machine, such as a computer or electronic system. For example, "memory" includes random-access memory (RAM), such as static RAM (SRAM) or dynamic RAM (DRAM); ROM; magnetic or optical storage medium; flash memory devices; electrical storage devices; optical storage devices; acoustical storage devices, and any type of tangible machine-readable medium suitable for storing or transmitting electronic instructions or information in a form readable by a machine (e.g., a computer).

Reference throughout this specification to "one embodiment" or "an embodiment" means that a particular feature, structure, or characteristic described in connection with the embodiment is included in at least one embodiment of the disclosure. Thus, the appearances of the phrases "in one embodiment" or "in an embodiment" in various places throughout this specification are not necessarily all referring to the same embodiment. Furthermore, the particular features, structures, or characteristics can be combined in any suitable manner in one or more embodiments.

In the foregoing specification, a detailed description has been given with reference to specific exemplary embodiments. It will, however, be evident that various modifications and changes can be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment, embodiment, and/or other exemplarily language does not necessarily refer to the same embodiment or the same example, but can refer to different and distinct embodiments, as well as potentially the same embodiment.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an embodiment" or "one embodiment" throughout is not intended to mean the same embodiment or embodiment unless described as such. Also, the terms "first, " "second," "third," "fourth," etc. as used herein are meant as labels to distinguish among different elements and can not necessarily have an ordinal meaning according to their numerical designation.

A digital computer program, which can also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a digital computing environment. The essential elements of a digital computer a central processing unit for performing or executing instructions and one or more memory devices for storing instructions and digital data. The central processing unit and the memory can be supplemented by, or incorporated in, special purpose logic circuitry or quantum simulators. Generally, a digital computer will also include, or be operatively coupled to receive digital data from or transfer digital data to, or both, one or more mass storage devices for storing digital data, e.g., magnetic, magneto-optical disks, optical disks, or systems suitable for storing information. However, a digital computer need not have such devices.

Digital computer-readable media suitable for storing digital computer program instructions and digital data include all forms of non-volatile digital memory, media, and memory devices, including by way of example semiconductor memory devices, e.g., EPROM, EEPROM, and flash memory devices; magnetic disks, e.g., internal hard disks or removable disks; magneto-optical disks; CD-ROM and DVD-ROM disks.

Control of the various systems described in this specification, or portions of them, can be implemented in a digital computer program product that includes instructions that are stored on one or more non-transitory machine-readable storage media, and that are executable on one or more digital processing devices. The systems described in this specification, or portions of them, can each be implemented as an apparatus, method, or system that can include one or more digital processing devices and memory to store executable instructions to perform the operations described in this specification.

While this specification contains many specific embodiment details, these should not be construed as limitations on the scope of what can be claimed, but rather as descriptions of features that can be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features can be described above as acting in certain combinations and even initially claimed as such, one or more features from a claimed combination can in some cases be excised from the combination, and the claimed combination can be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing can be advantageous.

The invention claimed is:

1. A method comprising:
receiving a prompt comprising a description associated with a target scene within a video;
generating a prompt embedding from the received prompt;
identifying a reference image embedding in a set of image embeddings each corresponding to a frame of the video, wherein the reference image embedding most closely aligns with the prompt embedding;
identifying, based on the reference image embedding, an image embedding corresponding to the prompt embedding; and
generating a video bookmark at a frame associated with the identified image embedding.

2. The method of claim 1, wherein the description associated with the target scene comprises at least one of a description of the target scene, a description of content of the target scene, or a description of a sentiment contained within the target scene.

3. The method of claim 1, further comprising generating the set of image embeddings each corresponding to a frame of the video.

4. The method of claim 3, wherein each corresponding frame is selected from a plurality of frames of the video according to at least one of, uniform subsampling or subsampling based on feature extraction from the plurality of video frames.

5. The method of claim 4, wherein the uniform subsampling or the subsampling based on the feature extraction is defined based on computational constraints of a hardware device.

6. The method of claim 3, wherein the set of image embeddings is generated using an image encoder, and the prompt embedding is generated using a text encoder.

7. The method of claim 6, wherein the image encoder and the text encoder have been trained to generate vectors in a shared vector space.

8. The method of claim 6, wherein the image encoder and the text encoder have been trained to generate closely aligned vectors in a shared vector space for images and textual descriptions that are semantically related.

9. The method of claim 6, wherein the image encoder and the text encoder have been trained to generate vectors in a shared vector space that minimize a contrastive loss function for images and textual descriptions that are semantically related.

10. The method of claim 1, wherein identifying the image embedding corresponding to the prompt embedding further comprises:
identifying neighboring frames of a video frame corresponding to the reference image embedding;
generating a second set of image embeddings from the identified neighboring frames; and
identifying, based on the second set of image embeddings, an image embedding corresponding to the prompt embedding.

11. The method of claim 1, wherein identifying an image embedding corresponding to the prompt embedding comprises:
generating a similarity score indicating a level of alignment between an image embedding from the set of image embeddings and the prompt embedding using at least one of a cosine similarity, a Euclidean distance, or a Manhattan distance between the image embedding and the prompt embedding.

12. A system comprising:
a memory; and
a processing device, coupled to the memory, to perform operations comprising:
receiving a prompt comprising a description associated with a target scene within a video;
generating a prompt embedding from the received prompt;
identifying a reference image embedding in a set of image embeddings each corresponding to a frame of the video, wherein the reference image embedding most closely aligns with the prompt embedding;
identifying, based on the reference image embedding, an image embedding corresponding to the prompt embedding; and
generating a video bookmark at a frame associated with the identified image embedding.

13. The system of claim 12, wherein the description associated with the target scene comprises at least one of a description of the target scene, a description of content of the target scene, or a description of a sentiment contained within the target scene.

14. The system of claim 12, the operations further comprising generating the set of image embeddings each corresponding to a frame of the video.

15. The system of claim 14, wherein each corresponding frame is selected from a plurality of frames of the video according to at least one of, uniform subsampling or subsampling based on feature extraction from the plurality of video frames.

16. The system of claim 14, wherein the set of image embeddings is generated using an image encoder, and the prompt embedding is generated using a text encoder, and wherein the image encoder and the text encoder have been trained to generate vectors in a shared vector space.

17. The system of claim 12, wherein identifying the image embedding corresponding to the prompt embedding further comprises:

identifying neighboring frames of a video frame corresponding to the reference image embedding;

generating a second set of image embeddings from the identified neighboring frames; and identifying, based on the second set of image embeddings, an image embedding corresponding to the prompt embedding.

18. A non-transitory computer readable storage medium comprising instructions that, when executed by a processing device, causes the processing device to perform operations further comprising:

receiving a prompt comprising a description associated with a target scene within a video;

generating a prompt embedding from the received prompt;

identifying a reference image embedding in a set of image embeddings each corresponding to a frame of the video, wherein the reference image embedding most closely aligns with the prompt embedding;

identifying, based on the reference image embedding, an image embedding corresponding to the prompt embedding; and generating a video bookmark at a frame associated with the identified image embedding.

19. The non-transitory computer readable storage medium of claim 18, wherein the description associated with the target scene comprises at least one of a description of the target scene, a description of content of the target scene, or a description of a sentiment contained within the target scene.

20. The non-transitory computer readable storage medium of claim 18, the operations further comprising generating the set of image embeddings each corresponding to a frame of the video.

21. The non-transitory computer readable storage medium of claim 18, wherein identifying the image embedding corresponding to the prompt embedding further comprises:

identifying neighboring frames of a video frame corresponding to the reference image embedding;

generating a second set of image embeddings from the identified neighboring frames; and identifying, based on the second set of image embeddings, an image embedding corresponding to the prompt embedding.

22. The non-transitory computer readable storage medium of claim 20, wherein the set of image embeddings is generated using an image encoder, and the prompt embedding is generated using a text encoder, and wherein the image encoder and the text encoder have been trained to generate vectors in a shared vector space.

\* \* \* \* \*